United States Patent
Sugano

(10) Patent No.: US 6,510,018 B1
(45) Date of Patent: Jan. 21, 2003

(54) MAGNETIC RECORDING AND REPRODUCING APPARATUS WITH ELECTRONIC ADJUSTMENTS OF INTERVAL BETWEEN STATIONARY AND ROTARY HEADS

(75) Inventor: Tetsuo Sugano, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/354,441

(22) Filed: Jul. 16, 1999

(30) Foreign Application Priority Data

Feb. 17, 1999 (JP) .......................... 11-038338

(51) Int. Cl.[7] .......................... G11B 5/584; G11B 27/36
(52) U.S. Cl. .......................... 360/77.13; 360/27; 360/31
(58) Field of Search .................. 360/31, 77.01, 360/77.12, 77.13, 77.14, 77.15, 27

(56) References Cited

U.S. PATENT DOCUMENTS 5,276,570 A  1/1994  Hong et al. ............... 360/73.13
5,500,775 A  3/1996  Fujita et al. ............... 360/50
6,288,864 B1 * 9/2001  Widener et al. .......... 360/77.13

FOREIGN PATENT DOCUMENTS

GB  9908207.5  12/1999
JP  10137098  5/1998

* cited by examiner

Primary Examiner—Andrew L. Sniezek
(74) Attorney, Agent, or Firm—Birch, Stewart, Kolasch & Birch, LLP

(57) ABSTRACT

When an operator inserts a standard magnetic tape into the magnetic recording and reproducing apparatus and performs operation for bringing the apparatus into the play mode for checking X value, the tracking value varies in stages, and an external device or the magnetic recording and reproducing apparatus produces an envelope detected output having a value corresponding to an output from the rotary heads, samples an envelope detected output at predetermined positions within a single trace by the rotary heads in each tracking value, and executes a check of the preset value (X value) or a check of the linearity of the tracking value of the rotary heads.

20 Claims, 8 Drawing Sheets

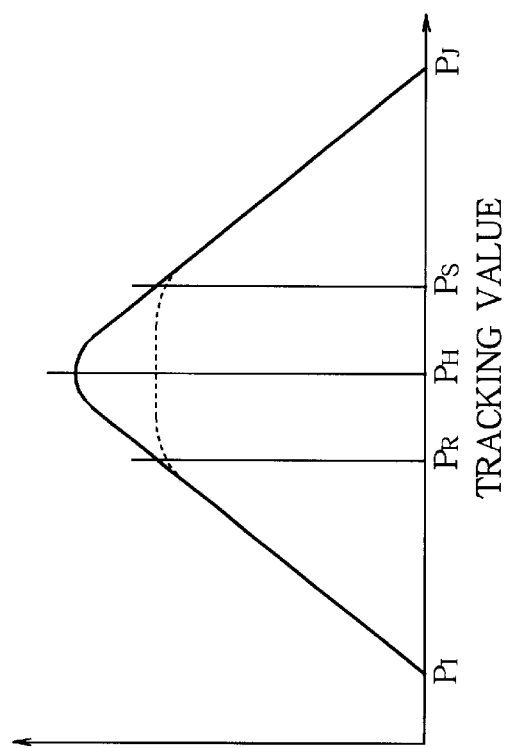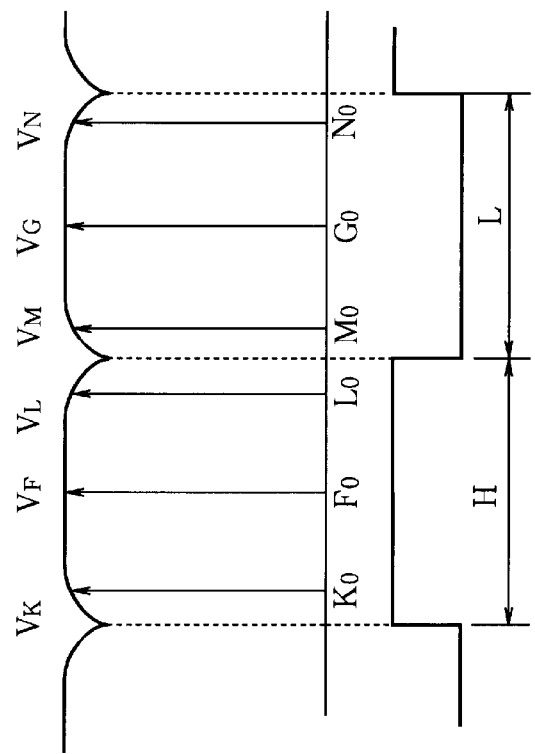
FIG.4
FIG.5

MAGNETIC RECORDING AND REPRODUCING APPARATUS WITH ELECTRONIC ADJUSTMENTS OF INTERVAL BETWEEN STATIONARY AND ROTARY HEADS

BACKGROUND OF THE INVENTION

The present invention relates to a magnetic recording and reproducing apparatus such as a videotape recorder utilizing a helical scanning method and a method for checking adjustment statuses of a rotary head thereof.

FIG. 10 to FIG. 12 are provided to illustrate a conventional method for checking adjustment statuses of the rotary heads of a magnetic recording and reproducing apparatus. FIG. 10 is a block diagram showing the configuration of the magnetic recording and reproducing apparatus and an adjustment device connected thereto. FIG. 11 illustrates a method for checking whether a preset value (hereinafter referred to as an X value) of a tracking value, which is a time interval corresponding to a distance $X_0$ between a magnetic tape trace position by a control head and a magnetic tape trace position by the rotary head, is within a predetermined range. FIG. 12 illustrates a method for checking whether the rotary head appropriately traces the recording track on a standard magnetic tape throughout its length (hereinafter referred to as a linearity check).

In a conventional X value check, an operator who adjusts the X value first mounts a standard magnetic tape for checking the X value (a cassette tape, for instance) 71 on the magnetic recording and reproducing apparatus to be checked (video deck to be tested) 50. On the standard magnetic tape 71 for checking the X value, the channel-1 video track 73, which is wider than the rotary head (video head) 12a of the target magnetic recording and reproducing apparatus 50, is recorded, and the channel-2 video track 74 indicated in FIG. 10 is not recorded. The width of the channel-1 video track 73 extends to the right in FIG. 10 and is greater than the width of the rotary head 12a. The operator next brings the magnetic recording and reproducing apparatus 50 into the play mode by using a remote controller 43 or the like, adjusts a manual tracking variable resistor (VR) 61 to decrease a high tracking value to a low value in stages, and manually sets such a tracking value that a video reproduction envelope output $S_{16}$ obtained by amplifying an output $S_{12}$ of the rotary head 12a reaches a transition point $P_1$ from a flat portion $A_1$ to an oblique portion $A_2$, as shown in FIG. 11. Then, the operator turns on the X value preset command switch (SW) 62 to return the tracking value to the preset value (which is, the X value), compares a value $V_{p1}$ of the video reproduction envelope output corresponding to the tracking value at the point $P_1$ and a value of the video reproduction envelope output corresponding to the X value, and judges, if a difference between the two values is within a predetermined range, that the X value set by the magnetic recording and reproducing apparatus 50 meets the format standard.

Further, a conventional linearity check (which is a compatibility check with respect to the trace status of the rotary heads of the magnetic recording and reproducing apparatus) is made by checking the flatness of the video reproduction envelope output $S_{16}$ (the amplitude corresponds to a width of an overlapping area of a trace range of the rotary head 12a or 12b and the video track) when the tracking value is varied. The operator who checks the linearity first mounts a standard magnetic tape for the linearity check (a cassette tape, for instance) 72 on the magnetic recording and reproducing apparatus 50 to be checked. On the standard magnetic tape 72 for the linearity check, the channel-1 video track 73 and the channel-2 video track 74, which are narrower than the rotary heads 12a and 12b of the target magnetic recording and reproducing apparatus 50, are recorded. The operator next brings the magnetic recording and reproducing apparatus 50 into the play mode by using the remote controller 43 or the like, and adjusts the manual tracking variable resistor 61 to change the tracking value so that video reproduction envelope output $S_{16}$ is maximized in both sections in which a drum FF signal $S_{21}$, which is a control signal to electrically switch the output of the rotary heads 12a and 12b, is high and low (the value is set to five divisions, for instance, as shown in FIG. 12). The operator next changes the tracking value to reduce the maximum value of the video reproduction envelope output $S_{16}$ (to four divisions, for instance, as shown in FIG. 12). If the minimum value of the video reproduction envelope output $S_{16}$ in a single cycle of the drum FF signal $S_{21}$ is greater than or equal to a predetermined value (Z divisions, for instance, as shown in FIG. 12), the flatness of the video reproduction envelope output is judged to meet the requirement and the target magnetic recording and reproducing apparatus 50 is judged to meet the linearity specified on the format.

In the above-mentioned conventional methods for checking adjustment statuses, however, the operator manually adjusts the tracking value, and the operator carries out checks on the X value and linearity of the magnetic recording and reproducing apparatus 50 by measuring a change in the video reproduction envelope output $S_{16}$, which indicates the relative positional relationship between the rotary head 12a or 12b and the track pattern. Therefore, the operator must have some experience, the time required to make a check depends on the operator, and the check accuracy may also depend on the operator. Since the standard magnetic tapes used for the X value check and linearity check are not the same, the operator gets a heavy workload of changing the tracking value of the different standard tapes separately.

SUMMARY OF THE INVENTION

It is an object of the present invention to provide a method for checking adjustment statuses of a magnetic recording and reproducing apparatus which takes some load off the operator and by which differences in experience and capability of operators do not affect the results of the check and the check period, and to provide a magnetic recording and reproducing apparatus which has a structure for executing the method for checking adjustment statuses or for allowing the method for checking adjustment statuses to be executed.

According to one aspect of the present invention, a method for checking adjustment statuses of a magnetic recording and reproducing apparatus is executed after a standard magnetic tape having a reference track recorded using the helical scanning method is loaded into the magnetic recording and reproducing apparatus and the system control means receives a command to start a play mode for checking adjustment statuses; and the method for checking adjustment statuses of the magnetic recording and reproducing apparatus comprises the steps of:
(a) setting a play mode for tracing a track of the standard magnetic tape by the rotary head, according to a command sent from the system control means to the servo means, and then varying the tracking value in stages within a predetermined range;
(b) generating an envelope detected output having a magnitude corresponding to an output from the rotary head for each of a plurality of tracking values within the predetermined range;

(c) sampling values of the envelope detected output in predetermined positions within a single tracing by the rotary head, for each of the plurality of tracking values within the predetermined range;

(d) obtaining a tracking value corresponding to a maximum of the values sampled from the envelope detected output; and (e) outputting a result of a check on whether the preset value is within a predetermined permissible range, according to a difference between the obtained tracking value and the preset value.

Further, values of the envelope detected output are sampled in a plurality of positions within a single tracing in the step (c); and the method for checking adjustment statuses further comprising the step of:

(f) outputting a result of a check on whether adjustment has been made so that a width of an overlapping area of a trace range by the rotary head and a reference track exceeds a permissible value, for each of a plurality of positions within a single tracing, according to whether a range of tracking values corresponding to the sampled values exceeding a predetermined reference value is wider than a predetermined reference width.

Furthermore, the step (b), step (c), step (d), and step (e) may be executed by an external device which exchanges signals with the magnetic recording and reproducing apparatus.

Moreover, the step (b), step (c), step (d), and step (e) may be executed by the system control means.

According to another aspect of the present invention, a method for checking adjustment statuses of a magnetic recording and reproducing apparatus is executed after a standard magnetic tape having a reference track recorded using the helical scanning method is loaded into the magnetic recording and reproducing apparatus and the system control means receives a command to start a play mode for checking adjustment statuses; and the method for checking adjustment statuses comprises the steps of:

(a) setting a play mode for tracing a track of the standard magnetic tape by the rotary head, according to a command sent from the system control means to the servo means, and then varying the tracking value in stages within a predetermined range;

(b) generating an envelope detected output having a magnitude corresponding to an output from the rotary head for each of a plurality of tracking values with in the predetermined range;

(c) sampling values of the envelope detected output in predetermined positions within a single tracing by the rotary head, for each of the plurality of tracking values within the predetermined range; and (f) outputting a result of a check on whether adjustment has been made so that a width of an overlapping area of a trace range by the rotary head and a reference track exceeds a permissible value, for each of a plurality of positions within a single tracing, according to whether a range of tracking values corresponding to the sampled values exceeding a predetermined reference value is wider than a predetermined reference width.

Further, the step (f) may be executed by an external device which exchanges signals with the magnetic recording and reproducing apparatus.

Furthermore, the external device may call a tracking value from a memory means provided in the magnetic recording and reproducing apparatus.

Moreover, the step (f) may be executed by the system control means.

According to still another aspect of the present invention, a magnetic recording and reproducing apparatus comprises: a rotary drum; a rotary head secured on the rotary drum for recording and reproducing information on a magnetic tape using a helical scanning method; a control head for recording and reproducing a control signal on the magnetic tape; a servo means for controlling a tracking value corresponding to a distance from a magnetic tape trace position by the control head to a magnetic tape trace position by the rotary head; and a system control means for controlling operation of the whole apparatus;

the magnetic recording and reproducing apparatus further comprises: a first terminal for outputting an envelope output from the rotary head for each of a plurality of tracking values within the predetermined range; a second terminal for outputting a tracking value set by the servo means; and a third terminal for inputting a command to the system control means;

wherein, after a standard magnetic tape having a reference track recorded using the helical scanning method is loaded into the magnetic recording and reproducing apparatus and the system control means receives a command to start a play mode for checking adjustment statuses, the system control means sends a command to the servo means so that a play mode for tracing a track of the standard magnetic tape by the rotary heads is set, and then varies the tracking value in stages within a predetermined range; and the first, second, and third terminals are connected to an external device, which generates an envelope detected output having a magnitude corresponding to an output from the rotary head for each of a plurality of tracking values within the predetermined range, samples values of the envelope detected output in predetermined positions within a single tracing by the rotary head, for each of the plurality of tracking values within the predetermined range, obtains a tracking value corresponding to a maximum of the values sampled from the envelope detected output, and outputs a result of a check on whether a preset value is within a predetermined permissible range, according to a difference between the obtained tracking value and the preset value.

Further, the external device connected to the first, second, and third terminals samples values of the envelope detected output in a plurality of positions within a single tracing and outputs a result of a check on whether adjustment has been made so that a width of an overlapping area of a trace range by the rotary head and a reference track exceeds a permissible value, for each of a plurality of positions within a single tracing, according to whether a range of tracking values corresponding to the sampled values exceeding a predetermined reference value is wider than a predetermined reference width.

According to a further aspect of the present invention, a magnetic recording and reproducing apparatus comprises: a rotary drum; a rotary head secured on the rotary drum for recording and reproducing information on a magnetic tape using a helical scanning method; a control head for recording and reproducing a control signal on the magnetic tape; a servo means for controlling a tracking value corresponding to a distance from a magnetic tape trace position by the control head to a magnetic tape trace position by the rotary heads; and a system control means for controlling operation of the whole apparatus;

the magnetic recording and reproducing apparatus further comprising: a first terminal for outputting an envelope output from the rotary head for each of a plurality of tracking values within the predetermined range; a second terminal for outputting a tracking value set by the servo means; and a third terminal for inputting a command to the system control means;

wherein, after a standard magnetic tape having a reference track recorded using the helical scanning method is loaded into the magnetic recording and reproducing apparatus and the system control means receives a command to start a play mode for checking adjustment statuses, the system control means sends a command to the servo means so that a play mode for tracing a track of the standard magnetic tape by the rotary heads is set, and then varies the tracking value in stages within a predetermined range; and the first, second, and third terminals are connected to an external device, which generates an envelope detected output having a magnitude corresponding to an output from the rotary head for each of a plurality of tracking values within the predetermined range, samples values of the envelope detected output in predetermined positions within a single tracing by the rotary head, for each of the plurality of tracking values within the predetermined range, and outputs a result of a check on whether adjustment has been made so that a width of an overlapping area of a trace range by the rotary head and a reference track exceeds a permissible value, for each of a plurality of positions within a single tracing, according to whether a range of tracking values corresponding to the sampled values exceeding a predetermined reference value is wider than a predetermined reference width.

Further, the apparatus may comprise a memory means for storing a tracking value varied within a predetermined range, wherein the external device calls the tracking value from the memory means.

According to a still further aspect of the present invention, a magnetic recording and reproducing apparatus comprises: a rotary drum; a rotary head secured on the rotary drum for recording and reproducing information on a magnetic tape using a helical scanning method; a control head for recording and reproducing a control signal on the magnetic tape; a servo means for controlling a tracking value corresponding to a distance from a magnetic tape trace position by the control head to a magnetic tape trace position by the rotary heads; and a system control means for controlling operation of the whole apparatus;

wherein, after a standard magnetic tape having a reference track recorded using a helical scanning method is loaded into the magnetic recording and reproducing apparatus and the system control means receives a command to start a play mode for checking adjustment statuses, the system control means sends a command to the servo means so that a play mode for tracing a track of the standard magnetic tape by the rotary heads is set, and then varies the tracking value in stages within a predetermined range, generates an envelope detected output having a magnitude corresponding to an output from the rotary head for each of a plurality of tracking values within the predetermined range, samples values of the envelope detected output in a predetermined position within a single tracing by the rotary head, for each of the plurality of tracking values within the predetermined range, obtains a tracking value corresponding to a maximum of the values sampled from the envelope detected output, and outputs a result of a check on whether a preset value is within a predetermined permissible range, according to a difference between the obtained tracking value and the preset value.

Further, when the system control means samples values of the envelope detected output, the values of the envelope detected output are sampled in a plurality of positions within a single tracing by the rotary head; and the system control means outputs a result of a check on whether adjustment has been made so that a width of an overlapping area of a trace range by the rotary head and a reference track exceeds a permissible value, for each of a plurality of positions within a single tracing, according to whether a range of tracking values corresponding to the sampled values exceeding a predetermined reference value is wider than a predetermined reference width.

According to a still further aspect of the present invention, a magnetic recording and reproducing apparatus comprises: a rotary drum; a rotary head secured on the rotary drum for recording and reproducing information on a magnetic tape using a helical scanning method; a control head for recording and reproducing a control signal on the magnetic tape; a servo means for controlling a tracking value corresponding to a distance from a magnetic tape trace position by the control head to a magnetic tape trace position by the rotary heads; and a system control means for controlling operation of the whole apparatus;

wherein, after a standard magnetic tape having a reference track recorded using a helical scanning method is loaded into the magnetic recording and reproducing apparatus and the system control means receives a command to start a play mode for checking adjustment statuses, the system control means sends a command to the servo means so that a play mode for tracing a track of the standard magnetic tape by the rotary heads is set, then varies the tracking value in stages within a predetermined range, generates an envelope detected output having a magnitude corresponding to an output from the rotary head for each of a plurality of tracking values within the predetermined range, samples values of the envelope detected output in a plurality of predetermined positions within a single tracing by the rotary head, for each of the plurality of tracking values within the predetermined range, and outputs a result of a check on whether adjustment has been made so that a width of an overlapping area of a trace range by the rotary head and a reference track exceeds a permissible value, for each of a plurality of positions within a single tracing, according to whether a range of tracking values corresponding to the sampled values exceeding a predetermined reference value is wider than a predetermined reference width.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 4 shows a characteristic curve representing how the values of the video reproduction envelope detected output at sampling points (sampling points shown in FIG. 3) vary when the tracking value is sequentially changed in checking adjustment statuses of the magnetic recording and reproducing apparatus according to the first, third, fourth, sixth, seventh, and ninth embodiments of the present invention;

FIG. 5 shows a waveform of the video reproduction envelope detected output and sampling points in checking adjustment statuses of the magnetic recording and reproducing apparatus according to the second, third, fifth, sixth, eighth, and seventh embodiments of the present invention;

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

First Embodiment

Figure 1:
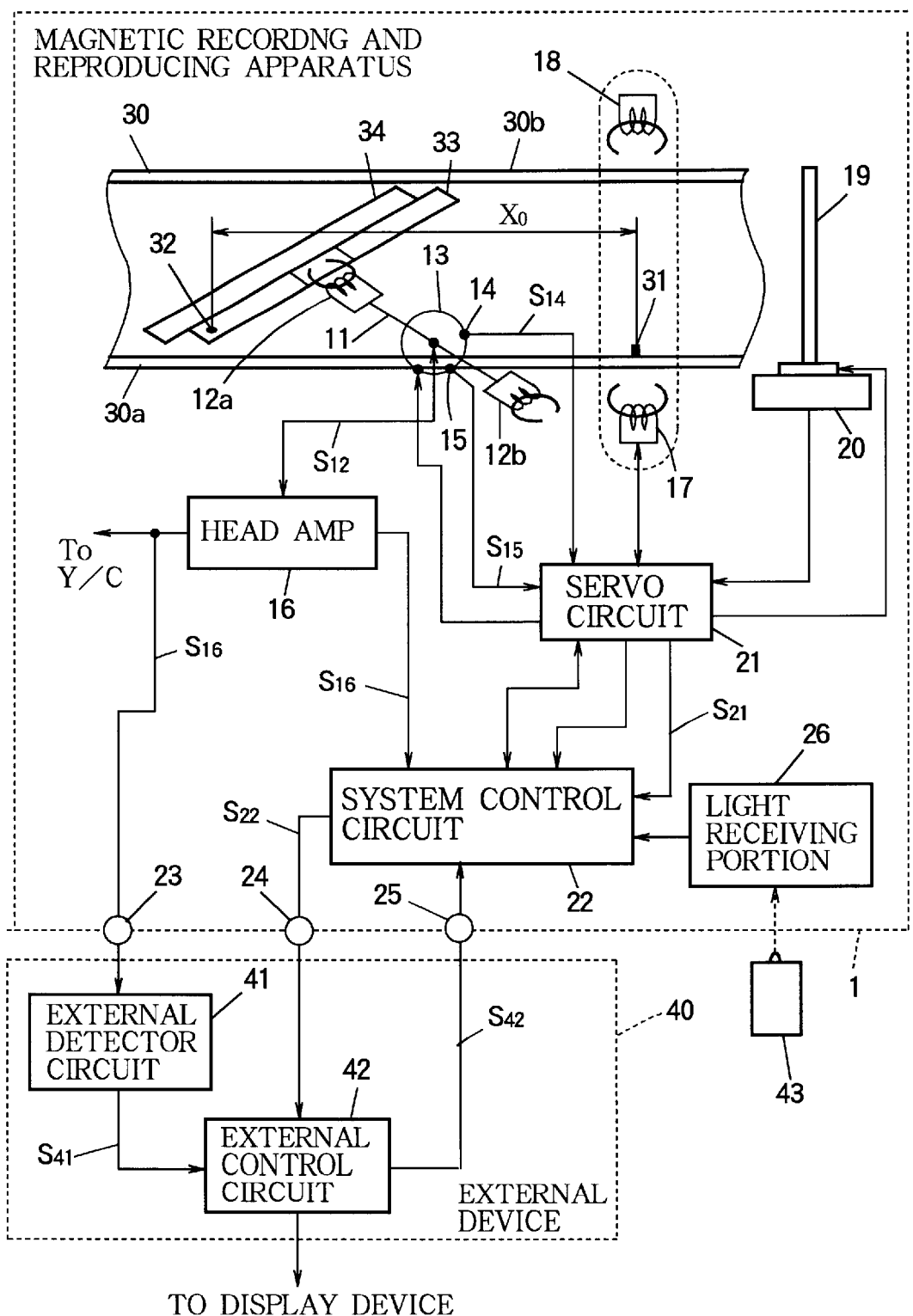
FIG. 1 is a block diagram showing the configuration of a magnetic recording and reproducing apparatus according to the first, second, and third embodiments of the present invention and the external device connected thereto.
Figure 2:
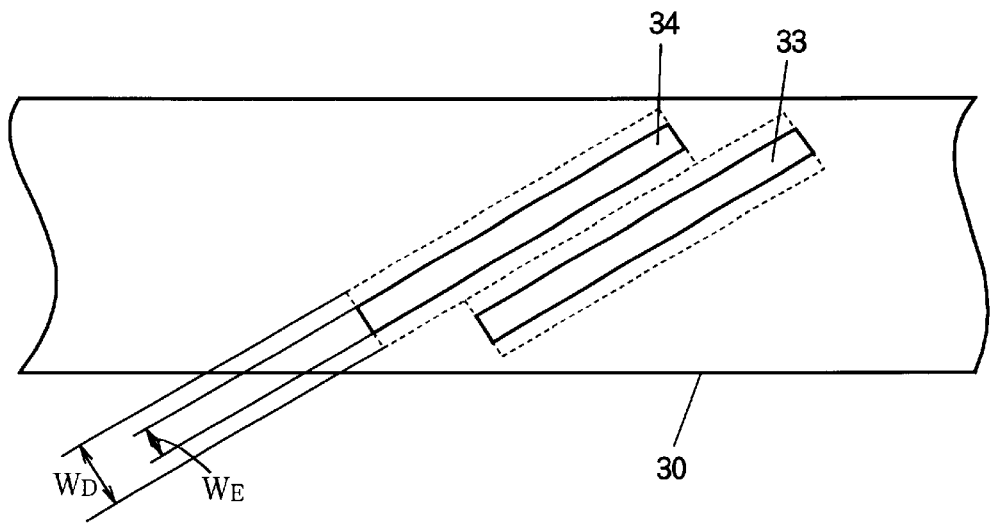
FIG. 2 schematically illustrates a recording format of a standard magnetic tape used to check adjustment statuses of the magnetic recording and reproducing apparatus according to the first to ninth embodiments of the present invention.
Figure 3:
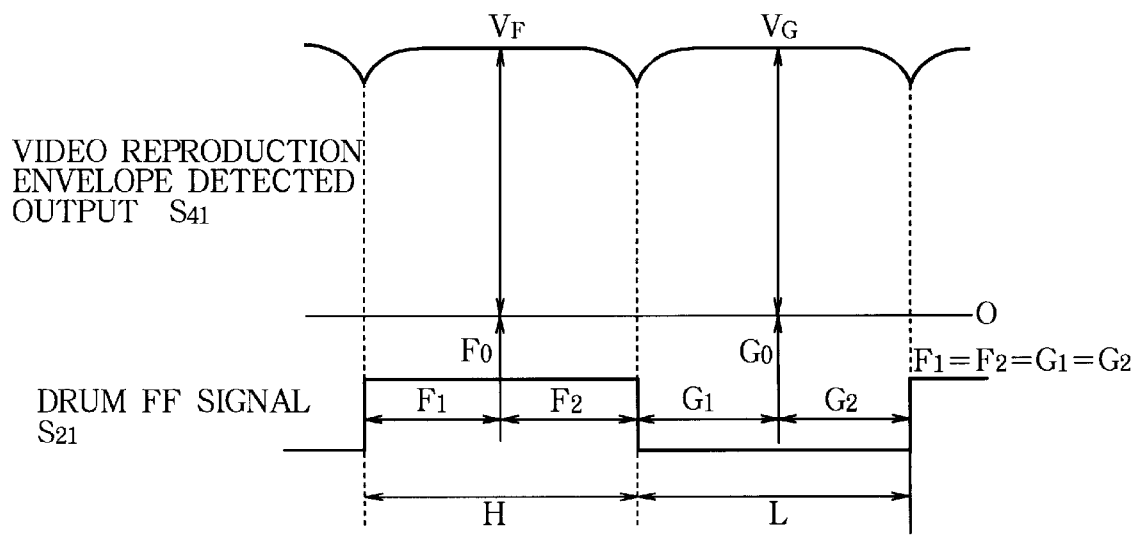
FIG. 3 shows a waveform of a video reproduction envelope detected output repeatedly generated for each tracing by the rotary head in checking adjustment statuses of the magnetic recording and reproducing apparatus according to the first, third, fourth, sixth, seventh, and ninth embodiments of the present invention and sampling points.

FIG. 1 is a block diagram showing the configuration of a magnetic recording and reproducing apparatus according to the first embodiment of the present invention (or a magnetic recording and reproducing apparatus using a method for checking adjustment statuses according to the first embodiment of the present invention) and an external device connected thereto. FIG. 2 schematically illustrates a recording format of a standard magnetic tape used to check the adjustment statuses of the magnetic recording and reproducing apparatus shown in FIG. 1 (just two video tracks are shown). FIG. 3 shows a waveform of the video reproduction envelope detected output repeatedly generated for each tracing by rotary heads (each time a drum FF signal goes high or low) and sampling points. FIG. 4 shows a characteristic curve which represents how the values of the video reproduction envelope detected output at the sampling points (the sampling points in FIG. 3) vary when the tracking value is sequentially varied. Further, FIG. 1 shows the state in which an external device 40 is connected to a magnetic recording and reproducing apparatus 1 in order to check a preset value o f the tracking value, which is an X value, during manufacturing or maintenance of the magnetic recording and reproducing apparatus 1, and the external device 40 is removed before the magnetic recording and reproducing apparatus 1 is shipped.

As shown in FIG. 1, the magnetic recording and reproducing apparatus 1 of the first embodiment has the rotary drum 11 (drawn by a straight line in the figure), rotary heads (video heads) 12a and 12b which are secured on the rotary drum 11 and record and reproduce information on a magnetic tape using a helical scanning method, a drum rotation device (drum MDA) 13 for rotating the rotary drum 11, a frequency generator (FG) 14 for outputting a detected rotational phase signal $S_{14}$ of the drum MDA 13, a drum pulse generator (drum PG) 15 for out putting a pulse signal $S_{15}$ having a cycle corresponding to the rotation speed of the drum MDA 13, and a head amplifier (HA) 16 for amplifying an output signal $S_{12}$ of the rotary heads 12a and 12b. The magnetic recording and reproducing apparatus 1 also has a control head (CTL head) 17 for recording and reproducing a control signal in the control track 30a on the magnetic tape 30, an audio head 18 for recording and reproducing an audio signal in the audio track 30b, a capstan 19 for feeding the magnetic tape 30 in contact with the magnetic tape 30, a capstan motor 20 for rotating the capstan 19, a servo circuit (S/V) 21 for sending a control signal to the capstan motor 20 or the drum MDA 13 in order to control the tracking value, which is a time interval corresponding to distance $X_0$ between the trace position 31 of the magnetic tape 30 by the CTL head 17 and the trace position (a position in the vicinity of a beginning of a single tracing, for instance) 32 of the magnetic tape 30 by the rotary head 12a (or 12b), and a system control circuit 22 for controlling operation of the whole apparatus. In the magnetic recording and reproducing apparatus of which adjustment statuses are checked, the tracking value is set to the preset value (X value).

On the standard magnetic tape 30 used to check adjustment statuses in the first embodiment, a track pattern of the helical scanning method is recorded as shown in FIG. 2 (just video tracks 33 and 34 are shown in the figure), by a standard deck having the standard X value and linearity of the format standard. Width $W_E$ of the video tracks 33 and 34 recorded on the standard magnetic tape 30 is slightly smaller than or equal to track width $W_D$ of the rotary heads 12a and 12b of the magnetic recording and reproducing apparatus 1 of which adjustment statuses are checked (also referred to as a deck to be tested)

The magnetic recording and reproducing apparatus 1 of the first embodiment further has a terminal 23 for outputting video reproduction envelope output $S_{16}$ which is output from the rotary heads 12a and 12b and amplified by the head amplifier 16, a terminal 24 for outputting signal $S_{22}$ which indicates the tracking value changed by the servo circuit 21 in the operation to check the X value, a terminal 25 for inputting command signal $S_{42}$ to the system control circuit 22, and a light receiving portion 26 for receiving the light of the command from a remote controller 43 and sending an electrical signal to the system control circuit 22.

On the other hand, the external device 40 has an external detector circuit 41 for receiving video reproduction envelope output $S_{16}$ which is supplied from the rotary heads 12a and 12b and amplified by the head amplifier 16 and for generating a video reproduction envelope detected output $S_{41}$ formed by converting the peak value of the input video reproduction envelope output $S_{16}$ into a direct-current value, and an external control circuit 42 for judging that the X value is set in a predetermined range and outputting a result (to a display device, for instance), if a difference between a tracking value $P_H$ corresponding to the maximum of the values of the video reproduction envelope detected output $S_{41}$ (characteristic curve in FIG. 4) at the sampling points and the preset value (X value) of the tracking value of the magnetic recording and reproducing apparatus 1 is within a predetermined allowable range. The external control circuit 42 is a microcomputer, for instance.

As shown in FIG. 3, the external control circuit 42 samples voltages $V_F$ and $V_G$ at points $F_0$ and $G_0$ ($F_1=F_2$, $G_1=G_2$) which are respectively in the vicinity of a center of sections in which the drum FF signal $S_{21}$ is high (H) or low (L) (H section and L section) from the input video reproduction envelope detected output $S_{41}$. The sampling points are not limited to the center points $F_0$ and $G_0$, but sampling values at center point is preferable to improving an accuracy of checking adjustment statuses of the X value because a variety of factors causing variability can be most effectively eliminated by sampling at center points.

While the tracking value is varied, the external control circuit 42 also keeps track of the values of the video reproduction envelope detected output $S_{41}$ at sampling points (points $F_0$ and $G_0$ in FIG. 3, for instance) corresponding to each of the changed tracking values, in a form of a characteristic curve as shown in FIG. 4, for instance, and detects tracking value $P_H$ corresponding to the peak value of the characteristic curve, as shown in FIG. 4. If the video reproduction envelope detected output $S_{41}$ has a flat section in the vicinity of the maximum value as shown by the broken line in FIG. 4, for instance, a midpoint between a point $P_R$ and a point $P_s$ where the video reproduction envelope detected output $S_{41}$ begins to fall is assumed to be a center point $P_H$. When the standard magnetic tape 30 is reproduced, the tracking value corresponding to the peak point of the characteristic curve (FIG. 4) of the values of the video reproduction envelope detected output $S_{41}$ at sampling points corresponds to the widest overlapping part of the range traced by the rotary heads 12a and 12b and the video track of the standard magnetic tape 30. Therefore, measuring the peak point of the characteristic curve (FIG. 4) of the values of video reproduction envelope detected output $S_{41}$ at sampling points is equivalent to measuring the variation of the X value of the magnetic recording and reproducing apparatus 1 of which adjustment statuses are checked.

Further, the external control circuit 22 stores the range of the preset values of the tracking values which are allowable in the standard format of the standard magnetic tape 30. The external control circuit 22 compares the preset value of tracking value with the X value actually obtained from the magnetic recording and reproducing apparatus 1 of which adjustment statuses are checked and judges that the X value is correctly adjusted if the difference is within a predetermined range or judges that the X value is not correctly adjusted if the difference exceeds the predetermined range. The external control circuit 42 outputs the result of the judgment in a form of information to be displayed on the display device (not shown) provided in the external device 40 or as an electrical signal to an external display device.

An actual procedure for checking the adjustment statuses of the X value and operations of the external device 40 and the like are described below. The operator connects by cables the external device 40 to the terminals 23, 24, and 25 of the magnetic recording and reproducing apparatus 1 of which X value is to be checked, sets up the external device 40, inserts the standard magnetic tape 30 as shown in FIG. 2 into the cassette inlet (not shown) of the magnetic recording and reproducing apparatus 1, and brings the magnetic recording and reproducing apparatus 1 into the play mode for checking the X value by operating the remote controller 43. As directed by the system control circuit 22, the tracking value of the magnetic recording and reproducing apparatus 1 in the play mode varies in stages within the range of $P_J$ to $P_I$ (FIG. 4); and the external control circuit 42 of the external device 40 obtains the characteristic curve (FIG. 4) representing the variations of values of the video reproduction envelope detected output $S_{41}$ at the sampling points ($F_0$ and $G_0$ shown in. FIG. 3, for instance) for each tracking value and finds tracking value $P_H$ corresponding to the peak value of the characteristic curve representing the values of the video reproduction envelope detected output $S_{41}$ at the sampling points. The external control circuit 42 calculates the difference between the tracking value $P_H$ (measured value) and the X value (preset value) of the magnetic recording and reproducing apparatus 1, judges whether the difference exceeds a predetermined reference value, and outputs the result of the judgment. If the difference does not exceed the reference value, the X value is judged to be appropriately adjusted. If the difference exceeds the reference value, the X value is judged to be inappropriately adjusted.

As has been described above, the magnetic recording and reproducing apparatus or the method for checking adjustment statuses according to the first embodiment automates the operations for checking the X value, so that a high-precision check can be made in a short time and the load of the check on the operator can be reduced.

In the explanation above, the video reproduction envelope output from the rotary heads 12a and 12b is used to check the X value, but the video reproduction envelope output $S_{16}$ can be replaced by the HI-FI reproduction envelope output which is output when the audio track recorded on a standard tape using the helical scanning method by the high-fidelity (HI-FI) audio head (not shown) secured on the rotary drum 13 or by both the HI-FI reproduction envelope output and video reproduction envelope output $S_{16}$.

Further, the sampling point of the video reproduction envelope detected output $S_{16}$ is not limited to the center point of the range in which the drum FF signal $S_{21}$ is high or low. The sampling point may be a point other than the center point or may be multiple points. Furthermore, the sampling points may be points across a part or the whole range in which the drum FF signal is high or low.

In the explanation above, the reproduction envelope output of the two channels of the drum FF signal $S_{21}$ is used, but just a single channel, high or low, may be used.

The play mode for checking adjustment statuses is not limited to the standard mode and may be a long time mode.

The track pattern recorded on the standard magnetic tape 30 by the standard deck is not limited to the pattern shown in FIG. 2 and may a pattern of a single channel, for instance, and the track width may be greater than the width of the rotary heads of the apparatus to be checked.

The external device 40 can be easily handled even by a general user and accordingly can be maintained by the user as needed, in addition to the time of manufacturing or maintenance. This takes some load of maintenance and inspection off the manufacturer.

The tracking value used to check adjustment statuses may be varied in such a manner that the video reproduction envelope detected output is followed back and forth for several times or may be finely varied in the vicinity of the transition point of the video reproduction envelope detected output $S_{41}$ and roughly otherwise.

A configuration to reset the preset value of the tracking value of the magnetic recording and reproducing apparatus 1 according to the result of checking adjustment statuses of the X value (by mechanical adjustment of the CTL head 17 and the like, for instance), through electrical adjustment is also possible.

Second Embodiment

The second embodiment of the present invention relates to checking the linearity of the rotary heads. A magnetic recording and reproducing apparatus according to the second embodiment (or a magnetic recording and reproducing apparatus using a method for checking adjustment statuses of the second embodiment of the present invention) and an external device connected thereto are configured in the same way as shown in FIG. 1. The recording format of the standard magnetic tape 30 used to check the linearity is the same as the format shown in FIG. 2. The second embodiment is different from the first embodiment in the processing of the external control circuit 42 of the external device 40.

Figure 6:
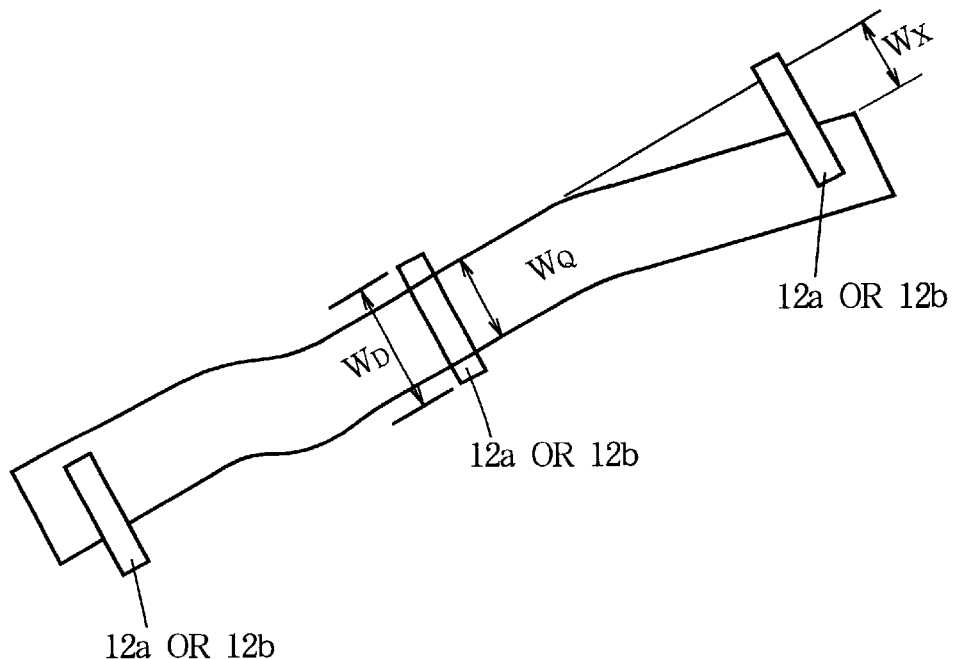
FIG. 6 shows the trace range of the rotary heads in the video track on the magnetic tape in checking adjustment statuses of the magnetic recording and reproducing apparatus according to the second, third, fifth, sixth, eighth, and ninth embodiments of the present invention.
Figure 7:
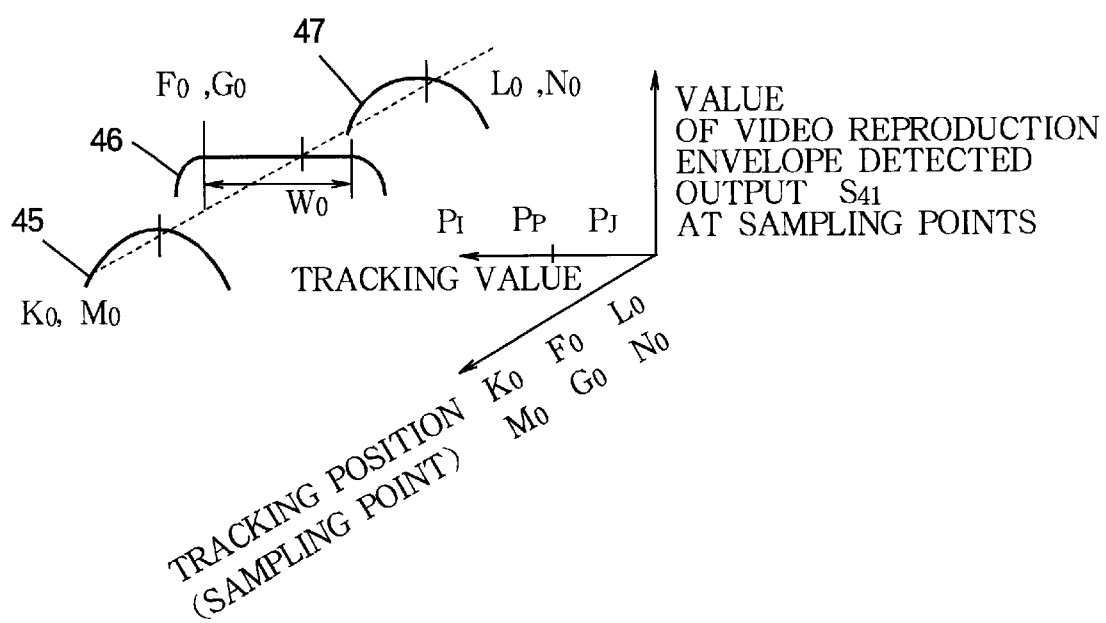
FIG. 7 shows a characteristic curve representing how the values of the video reproduction envelope detected output vary at sampling points (sampling points in FIG. 5) when the tracking value is sequentially varied in checking the adjustment statuses of the magnetic recording and reproducing apparatus according to the second, third, fifth, sixth, and seventh embodiments of the present invention, utilizing the positions of the sampling points as parameters.

FIG. 5 to FIG. 7 are associated with the second embodiment of the present invention. FIG. 5 shows a waveform of the video reproduction envelope detected output $S_{41}$ repeatedly generated for each tracing by the rotary heads (each time the drum FF signal $S_{21}$ goes high or low) and sampling points. FIG. 6 shows the trace of the rotary head (trace range) associated with the video track when the linearity is checked according to the flatness of the video reproduction envelope output. FIG. 7 shows the characteristic curve representing how the values of the video reproduction envelope detected output at the sampling points (sampling points shown in FIG. 5) change when the tracking value is sequentially changed to check adjustment statuses, using the positions of the sampling points as parameters.

The external control circuit 42 of the external device 40 of the second embodiment samples voltages $V_K$ and $V_M$, voltages $V_F$ and $V_G$, and voltages $V_L$ and $V_N$ of the input video reproduction envelope detected output $S_{41}$ at $K_0$ and $M_0$ in the vicinity of the beginning, at $F_0$ and $G_0$ in the vicinity of the center, and at $L_0$ and $N_0$ in the vicinity of the end of each section in which the drum FF signal $S_{21}$ is high or low (H section or L section), as shown in FIG. 5. The positions of the sampling points are not limited to the positions shown in FIG. 5, and the number of the sampling points per section is not limited to three, either. The external control circuit 42 also keeps track of the values of the video reproduction envelope detected output $S_{41}$ at the sampling points ($K_0$ and $M_0$ in the vicinity of the beginning, $F_0$ and $G_0$ in the vicinity of the center, and $L_0$ and $N_0$ in the vicinity of the end shown in FIG. 5, for instance) corresponding to each of the changed tracking values, in forms of characteristic curves 45, 46, and 47 as shown in FIG. 7, for instance.

The operation of the external device 40 will next be described in more detail. First, a command of reproduction operation is given by the remote controller 43, then a certain pause is taken until the operation of the servo circuit 21 and servo system is settled. If the command from the remote controller 43 is channel up, the system control circuit 22 controls the servo circuit 21 to change the tracking value from preset value $P_p$ shown in FIG. 7 straight to a minimum value $P_I$, then gradually to peak point $P_J$, and at last back to preset value $P_p$ again, and also outputs the current tracking value to the external control circuit 42 as data $S_{22}$ in real time. In contrast, if the command from the remote controller 42 is channel down, the system control circuit 22 controls the servo circuit 21 to change the tracking value from preset value $P_p$ shown in FIG. 7 straight to peak point $P_J$, then gradually to minimum point $P_I$, and at last back to preset value $P_p$ again, and also outputs the current tracking value to the external control circuit 22 as data $S_{22}$ in real time. These operations are performed once each, for instance. At the same time, the external detector circuit 41 converts the video reproduction envelope output $S_{16}$ into the video reproduction envelope detected output $S_{41}$ by converting the peak value into a direct-current value, and the converted output is supplied to the external control circuit 42. The external control circuit 42 is set to measure voltages of supplied video reproduction envelope detected output $S_{41}$ at $K_0$ and $M_0$ in the vicinity of the beginning, at $F_0$ and $G_0$ in the vicinity of the center, and at $L_0$ and $N_0$ in the vicinity of the end of each of the high and low sections of the drum FF signal $S_{21}$ as shown in FIG. 5. To check the flatness of the video reproduction envelope output $S_{16}$, variations in the video reproduction envelope output $S_{16}$ resulting from variations in the tracking value at the points in the vicinity of the center, beginning, and end are measured.

In FIG. 6 and FIG. 7, if adjustment has been performed to make the traveling path of the rotary head 12a relative to the standard magnetic tape 30 completely liner, for instance, the video reproduction envelope detected output $S_{41}$ must not vary but remain flat within the tracking range of width $W_Q$ at least when the tracking value changes, like the characteristic curve 46 of tracking values of the video reproduction envelope detected output $S_{41}$ at $F_0$ in the vicinity of the center of the drum FF signal $S_{21}$. Actually, because some adjustment statuses of the deck to be tested cause the traveling path of the rotary head 12a relative to the standard magnetic tape 30 to be changed, for instance, at the point $K_0$ or $M_0$, which corresponds to the entry of the standard magnetic tape 30, and at the point $L_0$ or $N_0$, which corresponds to the exit, as shown in FIG. 6, the characteristic curve has a very narrow flat part, like the characteristic curve 45 or 47 of tracking values of video reproduction envelope detected output $S_{41}$ at the point $K_0$ and $M_0$ in the vicinity of the beginning of drum FF signal $S_{21}$ and at the point $L_0$ and $N_0$ in the vicinity of the end point, as shown in FIG. 7.

The actual format standard allows some adjustment variability. Suppose that the tolerances are $\pm W=10$ μm from the center in the direction of the width of the video track. If width $W_Q$ of the recorded video track is 31 μm and if width $W_D$ of the head is 48 μm, flat part $W_Y$ of the video reproduction envelope detected output $S_{41}$ calculated with regard to the whole of the drum FF signal $S_{21}$ is $W_Y=W_D-(W_Q+W_x)=7$ μm at least. The external control circuit 42 stores time value $Y_0$ obtained by converting this $W_Y$ according to the tracking value variation speed, as a flatness evaluation value for checking the flatness. The tracking range of the flat part of the output provided in the measurement of the characteristic curve of the video reproduction envelope output obtained by changing the tracking value separately at points in the vicinity of the center, beginning, and end of the drum FF signal $S_{21}$ is compared.

Then, the external control circuit 42 compares the flatness evaluation value with the range of tracking values in each section with which the video reproduction envelope detected output is maintained to a certain value or above. If the flatness evaluation value stored in the external control circuit 42 is exceeded, the adjustment is judged to be correct. In contrast, if the flatness evaluation value is not exceeded, the adjustment is judged to be incorrect. The external control circuit 42 outputs the result of the judgment in a form of information to be displayed on the display device (not shown) provided in the external device 40 or as an electrical signal to an external display device.

The actual procedure for checking the adjustment statuses of linearity and operations by the external device 40 and the like are as described below, for instance. An operator connects by cables the external device 40 to the terminals 23, 24, and 25 of the magnetic recording and reproducing apparatus 1 to be subjected to the linearity check, sets up the external device 40, inserts the standard magnetic tape 30 as shown in FIG. 2 into the cassette inlet (not shown) of the magnetic recording and reproducing apparatus 1, and brings the magnetic recording and reproducing apparatus 1 into the play mode for checking linearity by using the remote controller 43. As directed by the system control circuit 22, the tracking value of the magnetic recording and reproducing apparatus 1 in the play mode changes in stages within the range of $P_J$ to $P_I$ (the tracking value may decrease from $P_J$ to $P_I$ or may increase from $P_I$ to $P_J$). The external device 40 obtains a characteristic curve (FIG. 7) representing the variation in the value of video reproduction envelope detected output $S_{41}$ at a sampling point corresponding to each tracking value, finds tracking value $P_H$ corresponding to the peak value of the characteristic curve representing the values of the video reproduction envelope detected output $S_{41}$ at the sampling points, calculates the difference between the found tracking value and the X value of the magnetic recording and reproducing apparatus 1, checks whether the linearity is within the predetermined permissible range, and outputs (displays, for instance) the result of the judgment of whether the linearity is within the permissible range.

As has been described above, the magnetic recording and reproducing apparatus or the method for checking adjustment statuses of the second embodiment automates the operations for checking the linearity of the rotary heads, so that a high-precision check can be made in a short time and the load of the check on the operator can be reduced.

The second embodiment is the same as the first embodiment in all respects other than those described above.

Third Embodiment

The third embodiment of the present invention relates to a check on both the linearity and X value of the rotary heads. A magnetic recording and reproducing apparatus of the third embodiment (or a magnetic recording and reproducing apparatus using a method for checking adjustment statuses of the third embodiment of the present invention) and an external device connected thereto are configured in the same way as shown in FIG. 1. The recording format of the standard magnetic tape 30 used to check the X value and linearity is the same as the format shown in FIG. 2. The third embodiment is different from the first and second embodiments described above in that both the X value check of the first embodiment and the linearity (flatness of the reproduction envelope output) check of the second embodiment are performed. The X value and linearity may be simultaneously checked, may be separately checked in a single operation session, or may be checked in different operation sessions. In order to improve the check accuracy, different standard magnetic tapes suited to the X value check and linearity check may also be used. The X value check and linearity check may be performed in any order, and the checked results may be displayed in any order or at the same time. The third embodiment is enabled because the processing to sample the video reproduction envelope detected output $S_{41}$ in the linearity check of the second embodiment substantially includes the sampling processing in he X value check of the first embodiment.

As has been described above, the magnetic recording and reproducing apparatus or the method for checking adjustment statuses of the third embodiment automates the operations for checking the X value and linearity, so that a high-precision check can be made in a short time and the load of the check on the operator can be reduced.

The third embodiment is the same as the first or second embodiment described above in all respects other than those described above.

Fourth Embodiment

Figure 8:
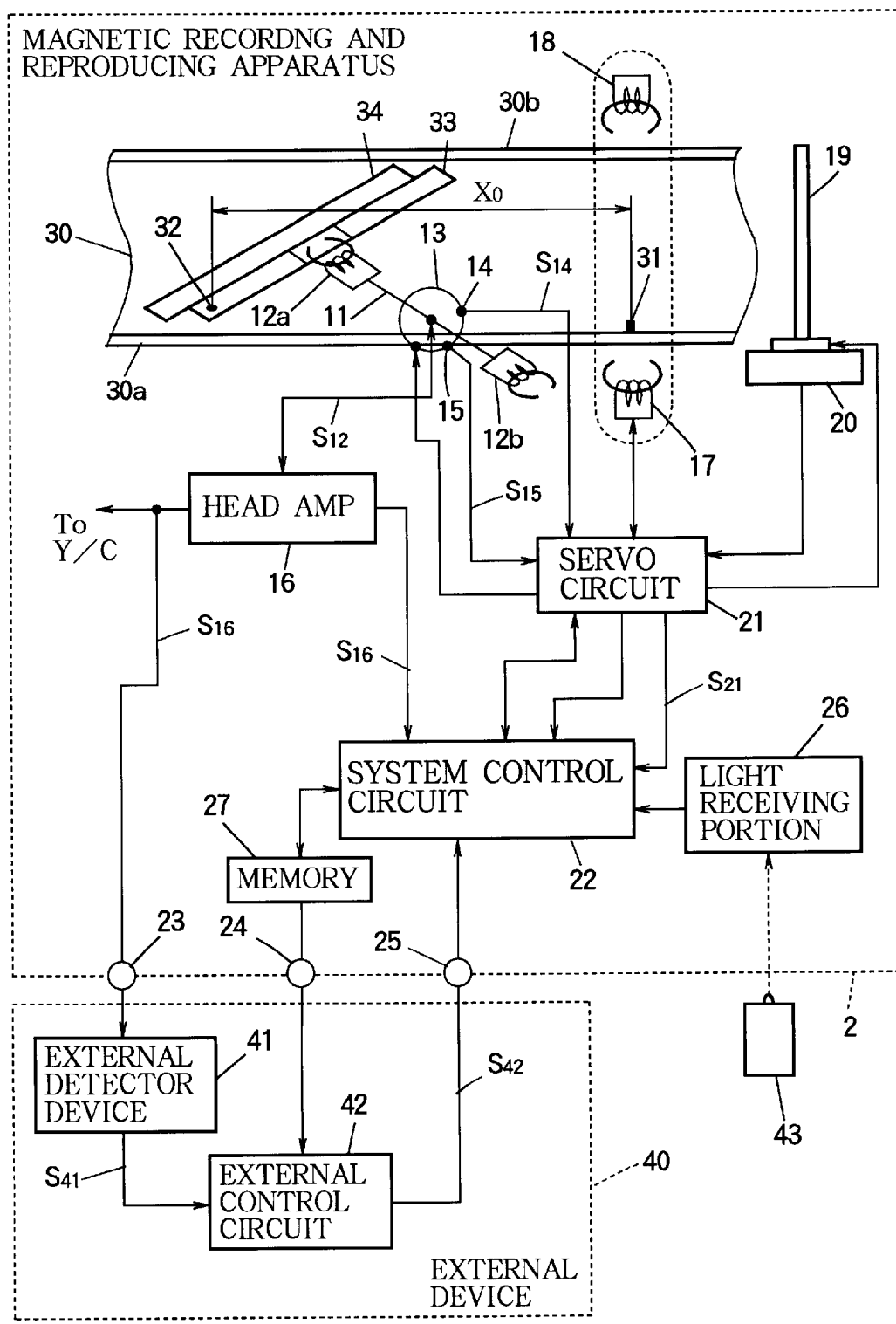
FIG. 8 is a block diagram showing the configuration of the magnetic recording and reproducing apparatus according to the fourth, fifth, and sixth embodiments of the present invention and the external device connected thereto.

FIG. 8 is a block diagram showing the configuration of a magnetic recording and reproducing apparatus of the fourth embodiment of the present invention (or a magnetic recording and reproducing apparatus using a method for checking adjustment statuses of the fourth embodiment of the present invention) and an external device connected thereto. In FIG. 8, a part which is the same as or corresponds to any part shown in FIG. 1 is identified by the same reference numeral. The magnetic recording and reproducing apparatus 2 of the fourth embodiment is different from the apparatus of the first embodiment described above in that the memory 27 for storing the tracking value output by the system control circuit 22 is provided and that the external control circuit 42 reads the tracking value from the memory 27. The fourth embodiment is the same as the first embodiment described above in all respects other than those described above.

Fifth Embodiment

The fifth embodiment of the present invention relates to a check on the linearity of the rotary heads. A magnetic recording and reproducing apparatus of the fifth embodiment (or a magnetic recording and reproducing apparatus using a method for checking adjustment statuses of the fifth embodiment of the present invention) and an external device connected thereto are configured in the same way as shown in FIG. 8. The recording format of the standard magnetic tape 30 used to check the linearity is the same as the format shown in FIG. 2. The fifth embodiment is different from the second embodiment in the processing of the external control circuit 42 of the external device 40. The fifth embodiment is the same as the second embodiment in all respects other than those described above.

Sixth Embodiment

The sixth embodiment of the present invention relates to a check on both the X value and linearity of the rotary heads. A magnetic recording and reproducing apparatus of the sixth embodiment (or a magnetic recording and reproducing apparatus using a method for checking adjustment statuses of the sixth embodiment of the present invention) and an external device connected thereto are configured in the same way as shown in FIG. 8. The recording format of the standard magnetic tape 30 used to check the X value and linearity is the same as the format shown in FIG. 2. The sixth embodiment is different from the third embodiment in the processing of the external control circuit 42 of the external device 40. The sixth embodiment is the same as the third embodiment in all respects other than those described above.

Seventh Embodiment

Figure 9:
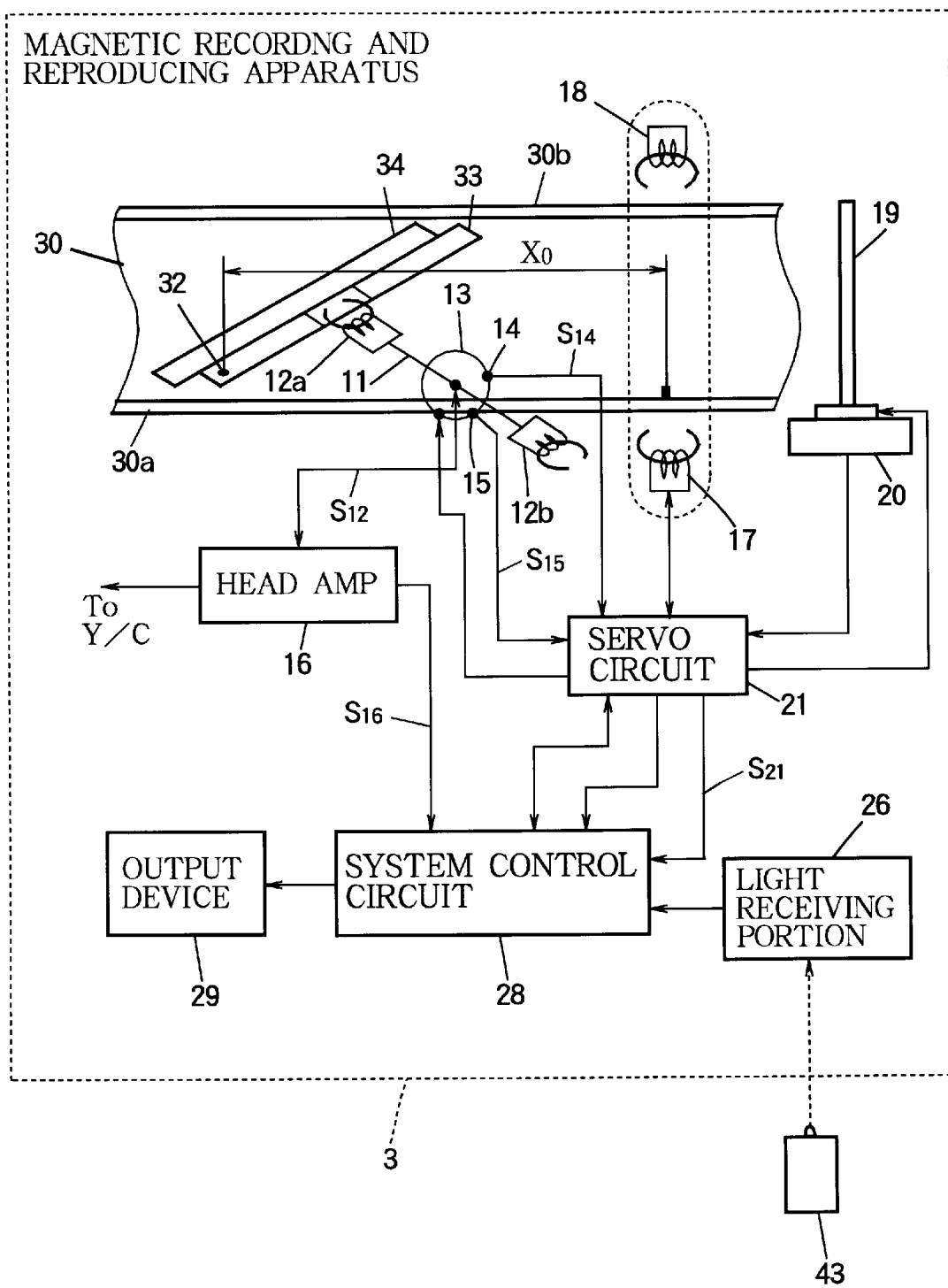
FIG. 9 is a block diagram showing the configuration of the magnetic recording and reproducing apparatus according to the seventh, eight, and ninth embodiments of the present invention.
Figure 10:
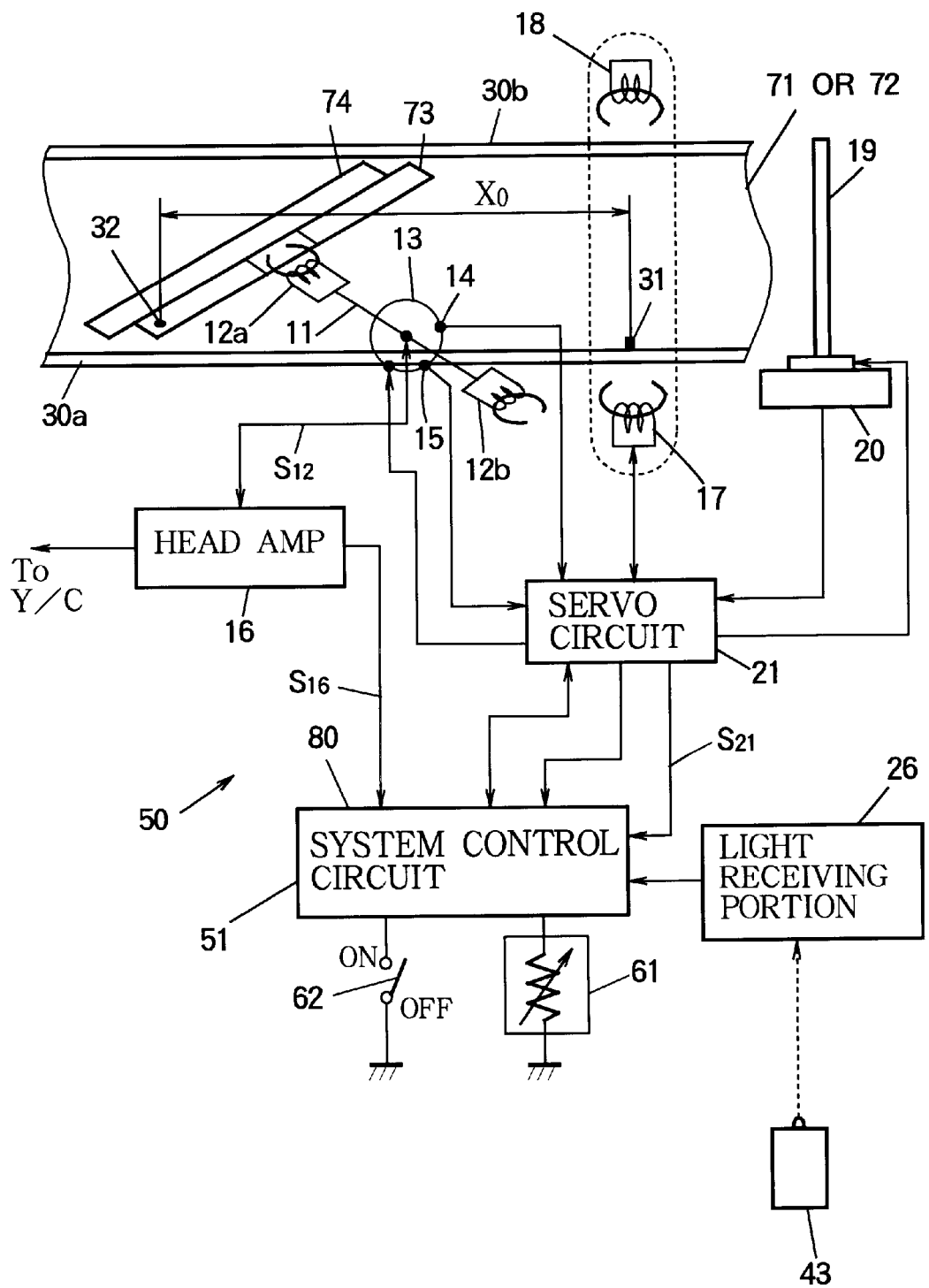
FIG. 10 is a block diagram of the conventional magnetic recording and reproducing apparatus and an apparatus for checking adjustment statuses.
Figure 11:
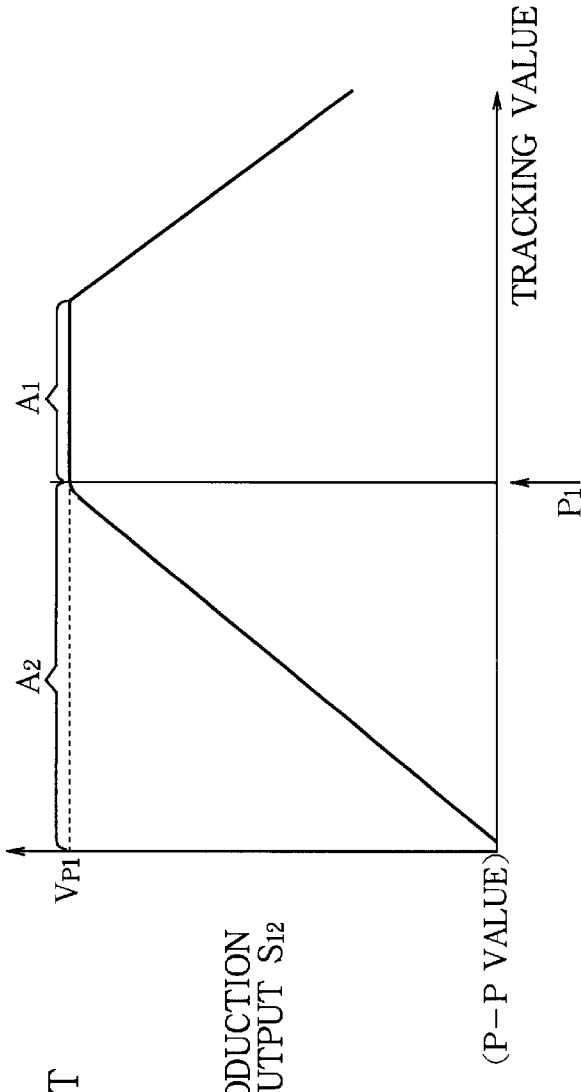
FIG. 11 illustrates a conventional method for checking whether the X value of the magnetic recording and reproducing apparatus shown in FIG. 10 is within a predetermined range.
Figure 12:
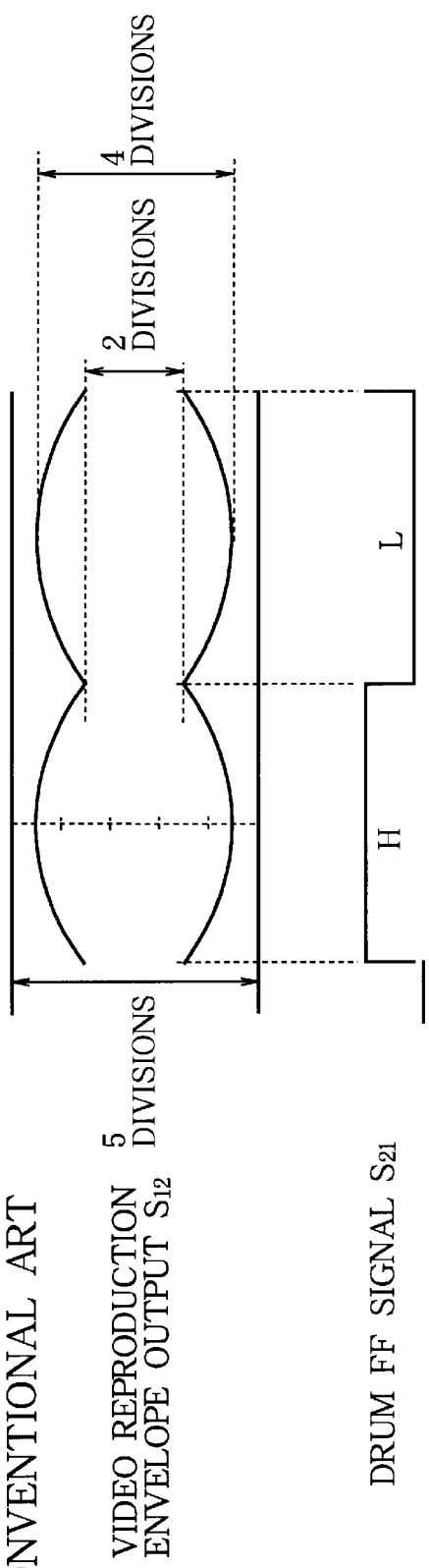
FIG. 12 illustrates a conventional method for checking whether the linearity of the magnetic recording and reproducing apparatus shown in FIG. 10 is within a predetermined range.

FIG. 9 is a block diagram showing the configuration of a magnetic recording and reproducing apparatus of the seventh embodiment of the present invention (or a magnetic recording and reproducing apparatus using a method for checking adjustment statuses of the seventh embodiment of the present invention). In FIG. 9, a part which is the same as or corresponds to any part shown in FIG. 1 is identified by the same reference numeral. The magnetic recording and reproducing apparatus 3 of the seventh embodiment is different from the magnetic recording and reproducing apparatus 1 of the first embodiment described above in the processing of the system control circuit 28 and in that the output device 29 such as a liquid crystal panel is provided and that the external device 40 as shown in FIG. 1 is not required.

The system control circuit 28 of the magnetic recording and reproducing apparatus 3 of the seventh embodiment has the function of the external device 40 connected to the magnetic recording and reproducing apparatus 1 in the first embodiment. Therefore, the X value can be checked as in the first embodiment without connecting the external device 40 as in the first embodiment. Since the magnetic recording and reproducing apparatus 3 of the seventh embodiment also comprises the output device 29, the operator can immediately get the result of the X value check from the output device 29.

The seventh embodiment is the same as the first embodiment in all respects other than those described above.

Eighth Embodiment

The eighth embodiment of the present invention relates to a check on the linearity of the rotary heads. A magnetic recording and reproducing apparatus of the eighth embodiment (or a magnetic recording and reproducing apparatus using a method for checking adjustment statuses of the eighth embodiment of the present invention) is configured in the same way as shown in FIG. 9. The recording format of the standard magnetic tape 30 used to check the linearity is the same as the format shown in FIG. 2. The magnetic recording and reproducing apparatus 3 of the eighth embodiment is different from the magnetic recording and reproducing apparatus 1 of the second embodiment described above in the processing of the system control circuit 28 and in that the output device 29 such as a liquid crystal panel is provided and that the external device 40 as shown in FIG. 1 is not required.

The system control circuit 28 of the magnetic recording and reproducing apparatus 3 of the eighth embodiment has the function of the external device 410 connected to the magnetic recording and reproducing apparatus 1 of the second embodiment. Therefore, the X value can be check ed as in the second embodiment without connecting the external device 40 as in the second embodiment. Since the magnetic recording and reproducing apparatus 3 of the eighth embodiment also comprises the output device 29, the operator can immediately get the result of the X value check from the output device 29.

The eighth embodiment is the same as the second embodiment in all respects other than those described above.

Ninth Embodiment

The ninth embodiment of the present invention relates to checks on both the X value and linearity of the rotary heads. A magnetic recording and reproducing apparatus of the ninth embodiment (or a magnetic recording and reproducing apparatus using a method for checking adjustment statuses of the ninth embodiment of the present invention) is configured in the same way as shown in FIG. 9. The recording format of the standard magnetic tape 30 used to check the linearity is the same as the format shown in FIG. 2. The magnetic recording and reproducing apparatus 3 of the ninth embodiment is different from the magnetic recording and reproducing apparatus 1 of the third embodiment described above in the processing of the system control circuit 28 and in that the output device 29 such as a liquid crystal panel is provided and that the external device 40 as shown in FIG. 1 is not required.

The system control circuit 28 of the magnetic recording and reproducing apparatus 3 of the ninth embodiment has the function of the external device 40 connected to the magnetic recording and reproducing apparatus 1 in the third embodiment. Therefore, the X value and linearity can be checked as in the third embodiment without connecting the external device 40 as in the third embodiment. Since the magnetic recording and reproducing apparatus 3 of the ninth embodiment also comprises the output device 29, the operator can immediately get the result of the X value check from the output device 29.

The ninth embodiment is same as the third embodiment in all respects other than those described above.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. A method for checking adjusting statuses of a magnetic recording and reproducing apparatus, which comprises a rotary drum, a rotary head secured on the rotary drum for recording and reproducing information on a magnetic tape using a helical scanning method, a control head for recording and reproducing a control signal on the magnetic tape, a servo means for controlling a tracking value corresponding to a distance from a magnetic tape trace position by the control head to a magnetic tape trace position by the rotary head, and a system control means which controls operation of the whole apparatus and has a tracking value set to a present value;

the method for checking adjustment statuses being executed after a standard magnetic tape having a reference track recorded using the helical scanning method is loaded into the magnetic recording and reproducing apparatus and the system control means receives a command to start a play mode for checking adjustment statuses; and the method for checking adjustment statuses of the magnetic recording and reproducing apparatus comprising the steps of:

(a) setting a play mode for tracing a track of the standard magnetic tape by the rotary head, according to a command sent from the system control means to the servo means, and then varying the tracking value in stages within a predetermined range;

(b) generating an envelope detected output having a magnitude corresponding to an output from the rotary head for each of a plurality of tracking values within the predetermined range;

(c) sampling values of the envelope detected output in predetermined positions within a single tracing by the rotary head, for each of the plurality of tracking value within the predetermined range;

(d) obtaining a tracking value corresponding to a maximum of the values sampled from the envelope detected output; and (e) outputting a result of a check on whether the preset value is within a predetermined permissible range, according to a difference between the obtained tracking value and the preset value;

wherein said step (b), step (c), step (d), and step (e) are executed by an external device which exchanges signals with the magnetic recording and reproducing apparatus.

2. The method for checking out adjustment statuses of a magnetic recording and reproducing apparatus according to claim 1, wherein values of the envelope detected output are sampled in a plurality of positions within a single tracing in said step (c);

the method for checking adjustment statuses further comprising the step of:

(f) outputting a result of a check on whether adjustment has been made so that a width of an overlapping area of a trace range by the rotary head and a reference track exceeds a permissible value, for each of a plurality of positions within a single tracing, according to whether a range of tracking values corresponding to the sampled values exceeding a predetermined reference value is wider than a predetermined reference width.

3. The method for checking adjustment statuses of a magnetic recording and reproducing apparatus according to claim 2, wherein said step (f) is executed by an external device which exchanges signals with the magnetic recording and reproducing apparatus.

4. The method for checking adjustment statuses of a magnetic recording and reproducing apparatus according to claim 2, wherein said step (f) is executed by the system control means.

5. The method for checking adjustment statuses of a magnetic recording and reproducing apparatus according to claim 1, wherein the external device calls a tracking value from a memory means provided in the magnetic recording and reproducing apparatus.

6. A method for checking adjustment statuses of a magnetic recording and reproducing apparatus, which comprises a rotary drum, a rotary head secured on the rotary drum for recording and reproducing information on a magnetic tape using a helical scanning method, a control head for recording and reproducing a control signal on the magnetic tape, a servo means for controlling a tracking value corresponding to a distance from a magnetic tape trace position by the control head to a magnetic tape trace position by the rotary head, and a system control means which controls operation of the whole apparatus and has a tracking value set to a preset value;

the method for checking adjustment statuses being executed after a standard magnetic tape having a reference track recorded using the helical scanning method is loaded into the magnetic recording and reproducing apparatus and the system control means receives a command to start a play mode for checking adjustment statuses; and the method for checking adjustment statuses of the magnetic recording and reproducing apparatus comprising the steps of:

(a) setting a play mode for tracing a track of the standard magnetic tape by the rotary head, according to a command sent from the system control means to the servo means, and then varying the tracking value in stages within a predetermined range;

(b) generating an envelope detected output having a magnitude corresponding to an output from the rotary head for each of a plurality of tracking values within the predetermined range;

(c) sampling values of the envelope detected output in predetermined positions within a single tracing by the rotary head, for each of the plurality of tracking values within the predetermined range;

(d) obtaining a tracking value corresponding to a maximum of the values sampled from the envelope detected output; and (e) outputting a result of a check on whether the preset value is within a predetermined permissible range, according to a difference between the obtained tracking value and the present value;

wherein said step (b), step (c), step (d), and step (e) are executed by the system control means.

7. The method for checking adjustment statuses of a magnetic recording and reproducing. apparatus according to claim 6, wherein values of the envelope detected output are sampled in a plurality of positions within a single tracing in said step (c);

the method for checking adjustment statuses further comprising the step of:

(f) outputting a result of a check on whether adjustment has been made so that a width of an overlapping area of a trace range by the rotary head and a reference track exceeds a permissible value, for each of a plurality of positions within a single tracing, according to whether a range of tracking values corresponding to the sampled values exceeding a predetermined reference value is wider than a predetermined reference width.

8. The method for checking adjustment statuses of a magnetic recording and reproducing apparatus according to claim 7, wherein said step (f)is executed by an external device which exchanges signals with the magnetic recording and reproducing apparatus.

9. The method for checking adjustment statuses of a magnetic recording and reproducing apparatus according to claim 7, wherein said step (f) is executed by the system control means.

10. A method for checking adjustment statuses of a magnetic recording and reproducing apparatus, which comprises a rotary drum, a rotary head secured on the rotary drum for recording and reproducing information on a magnetic tape in a helical scanning method, a control head for recording and reproducing a control signal on a magnetic tape, a servo means for controlling a tracking value corresponding to a distance from a magnetic tape trace position by the control head to a magnetic tape trace position by the rotary head, and a system control means which controls operation of the whole apparatus and has a tracking value set to a preset value;

the method for checking adjustment statuses being executed after a standard magnetic tape having a reference track recorded using the helical scanning method is loaded into the magnetic recording and reproducing apparatus and the system control means receives a command to start a play mode for checking adjustment statuses; and the method for checking adjustment statuses of the magnetic recording and reproducing apparatus comprising the steps of:

(a) setting a play mode for tracing a track of the standard magnetic tape by the rotary head, according to a command sent from the system control means to the servo means, and then varying the tracking value in stages within a predetermined range;

(b) generating an envelope detected output having a magnitude corresponding to an output from the rotary head for each of a plurality of tracking values within the predetermined range;

(c) sampling values of the envelope detected output in predetermined positions within a single tracing by the rotary head, for each of the plurality of tracking values within the predetermined range; and (f) outputting result of a check on whether adjustment has been made so that a width of an overlapping area of a trace range by the rotary head and a reference track exceeds a permissible value, for each of a plurality of positions within a single tracing, according to whether a range of tracking values corresponding to the sampled values exceeding a predetermined reference value is wider than a predetermined reference width;

wherein said step (f) is executed by an external device which exchanges signals with the magnetic recording and reproducing apparatus.

11. The method for checking adjustment statuses of a magnetic recording and reproducing apparatus according to claim 10, wherein said step (f) is executed by the system control means.

12. A method for checking adjustment statuses of a magnetic recording and reproducing apparatus, which comprises a rotary drum, a rotary head secured on the rotary drum for recording and reproducing information on a magnetic tape in a helical scanning method, a control head for recording and reproducing a control signal on a magnetic tape, a servo means for controlling a tracking value corresponding to distance from a magnetic tape trace position by the control head to a magnetic tape trace position by the rotary head, and a system control means which controls operation of the whole apparatus and has a tracking value set to a preset value;

the method for checking adjustment statuses being executed after a standard magnetic tape having a reference track recorded using the helical scanning method is loaded into the magnetic recording and reproducing apparatus and the system control means receives a command to start a play mode for checking adjustment statuses; and the method for checking adjustment statuses of the magnetic recording and reproducing apparatus comprising the steps of:

(a) setting a play mode for tracing a track of the standard magnetic tape by the rotary head, according to a command sent from the system control means to the servo means, and then varying the tracking value in stages within a predetermined range;

(b) generating an envelope detected output having a magnitude corresponding to an output from the rotary head for each of a plurality of tracking values within the predetermined range;

(c) sampling values of the envelope detected output in predetermined positions within a single tracing by the rotary head, for each of the plurality of tracking values within the predetermined range; and (f) outputting a result of a check on whether adjustment has been made so that a width of an overlapping area of a trace range by the rotary head and a reference track exceeds a permissible value, for each of a plurality of positions within a single tracing, according to whether a range of tracking values corresponding to the sampled values exceeding a predetermined reference value is wider than a predetermined reference width;

wherein the external device calls a tracking value from a memory means provided in the magnetic recording and reproducing apparatus.

13. A magnetic recording and reproducing apparatus comprising:

a rotary drum;

a rotary head secured on said rotary drum for recording and reproducing information on a magnetic tape using a helical scanning method;

a control head for recording and reproducing a control signal on the magnetic tape;

a servo means for controlling a tracking value corresponding to a distance from a magnetic tape trace position by said control head to a magnetic tape trace position by said rotary head; and a system control means for controlling operation of the whole apparatus and providing at least one preset value;

the magnetic recording and reproducing apparatus further comprising:

a first terminal for outputting an envelope output from said rotary head for each of a plurality of tracking values within the predetermined range;

a second terminal for outputting a tracking value set by said servo means; and a third terminal for inputting a command to said system control means;

wherein, after a standard magnetic tape having a reference track recorded using the helical scanning method is loaded into said magnetic recording and reproducing apparatus and said system control means receives a command to start a play mode for checking adjustment statuses, said system control means sends a command to said servo means so that a play mode for tracing a track of the standard magnetic tape by the rotary heads is set, and then varies the tracking value in stages within a predetermined range; and said first, second, and third terminals are connected to an external device, which generates an envelope detected output having a magnitude corresponding to an output from said rotary head for each of a plurality of tracking values within the predetermined range, samples values of the envelope detected output in predetermined positions within a single tracing by said rotary head, for each of the plurality of tracking values within the predetermined range, obtains a tracking value corresponding to a maximum of the values sampled from the envelope detected output, and outputs a result of a check on whether the preset value is within a predetermined permissible range, according to a difference between the obtained tracking value and the preset value.

14. The magnetic recording and reproducing apparatus according to claim 13, wherein the external device connected to said first, second, and third terminals samples values of the envelope detected output in a plurality of positions within a single tracing and outputs a result of a check on whether adjustment has been made so that a width of an overlapping area of a trace range by said rotary head and a reference track exceeds a permissible value, for each of a plurality of positions within a single tracing, according to whether a range of tracking values corresponding to the sampled values exceeding a predetermined reference value is wider than a predetermined reference width.

15. The magnetic recording and reproducing apparatus according to claim 13, further comprising a memory means for storing a tracking value varied within a predetermined range, wherein the external device calls the tracking value from said memory means.

16. A magnetic recording and reproducing apparatus comprising:

a rotary drum;

a rotary head secured on said rotary drum for recording and reproducing information on a magnetic tape using a helical scanning method;

a control head for recording and reproducing a control signal on the magnetic tape;

a servo means for controlling a tracking value corresponding to a distance from a magnetic tape trace position by said control head to a magnetic tape trace position by said rotary heads; and a system control means for controlling operation of the whole apparatus and providing at least one predetermined reference value;

the magnetic recording and reproducing apparatus further comprising:

a first terminal for outputting an envelope output from said rotary head for each of a plurality of tracking values within the predetermined range;

a second terminal for outputting a tracking value set by the servo means; and a third terminal for inputting a command to said system control means;

wherein, after a standard magnetic tape having a reference track recorded using the helical scanning method is loaded into said magnetic recording and reproducing apparatus and said system control means receives a command to start a play mode for checking adjustment statuses, said system control means sends a command to said servo means so that a play mode for tracing a track of the standard magnetic tape by the rotary heads is set, and then varies the tracking value in stages within a predetermined range; and said first, second, and third terminals are connected to an external device, which generates an envelope detected output having a magnitude corresponding to an output from said rotary head for each of a plurality of tracking values within the predetermined range, samples values of the envelope detected output in predetermined positions within a single tracing by said rotary head, for each of the plurality of tracking values within the predetermined range, and outputs a result of a check on whether adjustment has been made so that a width of an overlapping area of a trace range by said rotary head and a reference track exceeds a permissible value, for each of a plurality of positions within a single tracing, according to whether a range of tracking values corresponding to the sampled values exceeding the predetermined reference value is wider than a predetermined reference width.

17. The magnetic recording and reproducing apparatus according to claim 16, further comprising a memory means for storing a tracking value varied within a predetermined range, wherein the external device calls the tracking value from said memory means.

18. A magnetic recording and reproducing apparatus comprising:

a rotary drum;

a rotary head secured on said rotary drum for recording and reproducing information on a magnetic tape using a helical scanning method;

a control head for recording and reproducing a control signal on the magnetic tape;

a servo means for controlling a tracking value corresponding to a distance from a magnetic tape trace position by said control head to a magnetic tape trace position by said rotary heads; and a system control means for controlling operation of the whole apparatus and providing at least one preset value;

wherein, after a standard magnetic tape having a reference track recorded using a helical scanning method is loaded into said magnetic recording and reproducing apparatus and said system control means receives a command to start a play mode for checking adjustment statuses, said system control means sends a command to said servo means so that a play mode for tracing a track of the standard magnetic tape by said rotary heads is set, and then varies the tracking value in stages within a predetermined range, generates an envelope detected output having a magnitude corresponding to an output from said rotary head for each of a plurality of tracking values within the predetermined range, samples values of the envelope detected output in a predetermined position within a single tracing by said rotary head, for each of the plurality of tracking values within the predetermined range, obtains a tracking value corresponding to a maximum of the values sampled from the envelope detected output, and outputs a result of a check on whether the preset value is within a predetermined permissible range, according to a difference between the obtained tracking value and the preset value.

19. The magnetic recording and reproducing apparatus according to claim 18, wherein when the system control means samples values of the envelope detected output, the values of the envelope detected output are sampled in a plurality of positions within a single tracing by said rotary head; and said system control means outputs a result of a check on whether adjustment has been made so that a width of an overlapping area of a trace range by said rotary head and a reference track exceeds a permissible value, for each of a plurality of positions within a single tracing, according to whether a range of tracking values corresponding to the sampled values exceeding a predetermined reference value is wider than a predetermined reference width.

20. A magnetic recording and reproducing apparatus comprising:

a rotary drum;

a rotary head secured on said rotary drum for recording and reproducing information on a magnetic tape using a helical scanning method;

a control head for recording and reproducing a control signal on the magnetic tape;

a servo means for controlling a tracking value corresponding to a distance from a magnetic tape trace position by said control head to a magnetic tape trace position by said rotary heads; and a system control means for controlling operation of the whole apparatus and providing at least one predetermined reference value;

wherein, after a standard magnetic tape having a reference track recorded using a helical scanning method is loaded into said magnetic recording and reproducing apparatus and said system control means receives a command to start a play mode for checking adjustment statuses, said system control means sends a command to said servo means so that a play mode for tracing a track of the standard magnetic tape by said rotary heads is set, then varies the tracking value in stages within a predetermined range, generates an envelope detected output having a magnitude corresponding to an output from said rotary head for each of a plurality of tracking values within the predetermined range, samples values of the envelope detected output in a plurality of predetermined positions within a single tracing by said rotary head, for each of the plurality of tracking values within the predetermined range, and outputs a result of a check on whether adjustment has been made so that a width of an overlapping area of a trace range by said rotary head and a reference track exceeds a permissible value, for each of a plurality of positions within a single tracing, according to whether a range of tracking values corresponding to the sampled values exceeding the predetermined reference value is wider than a predetermined reference width.

* * * * *